(12) United States Patent
Hamilton et al.

(10) Patent No.: US 9,698,834 B2
(45) Date of Patent: Jul. 4, 2017

(54) INTELLIGENT RF REDUNDANCY SWITCH

(71) Applicant: SED SYSTEMS, A DIVISION OF CALIAN LTD., Saskatoon (CA)

(72) Inventors: Kendrick Hamilton, Saskatoon (CA); Seann Hamer, Saskatoon (CA); Peter Waskowic, Saskatoon (CA)

(73) Assignee: SED SYSTEMS, A DIVISION OF CALIAN GROUP LTD., Saskatoon, Saskatchewan (CA)

( * ) Notice: Subject to any disclaimer, the term of this patent is extended or adjusted under 35 U.S.C. 154(b) by 0 days.

(21) Appl. No.: 15/053,709

(22) Filed: Feb. 25, 2016

(65) Prior Publication Data

US 2016/0248466 A1    Aug. 25, 2016

(30) Foreign Application Priority Data

Feb. 25, 2015   (CA) ...................................... 2883117

(51) Int. Cl.
*H04B 1/38*   (2015.01)
*H04B 1/04*   (2006.01)

(52) U.S. Cl.
CPC .................................. *H04B 1/0466* (2013.01)

(58) Field of Classification Search
CPC ........ G01S 13/74; G01S 13/87; G01S 13/953; G01S 7/03; G01S 7/40; H04H 60/09; H04H 20/12; H04H 20/14; H04H 60/11; H04L 1/22; H04L 49/10; H04L 27/362; H04B 1/005; H04B 1/0483; H04B 1/1036; H04B 1/40; H04B 1/44; H04B 1/74; H04B 2001/1072; H04B 7/06; H04B 7/12; H04B 7/18515

See application file for complete search history.

(56) References Cited

U.S. PATENT DOCUMENTS

| | | | |
|---|---|---|---|
| 8,031,045 B1 * | 10/2011 | Tsvey ..................... | H04N 7/104 324/123 R |
| 9,287,062 B2 * | 3/2016 | Becker ..................... | H01P 1/15 |
| 2008/0122683 A1 * | 5/2008 | Howley ..................... | G01S 3/04 342/149 |

* cited by examiner

*Primary Examiner* — Golam Sorowar
(74) *Attorney, Agent, or Firm* — Stites & Harbison, PLLC; Jeffrey A. Haeberlin

(57) ABSTRACT

An RF redundancy switch for selecting and outputting an output signal from a plurality of source signals. The RF redundancy switch selects the output signal from the input RF signals based on measurement of at least one signal validity criteria for the plurality of source signals, by application of a signal selection function thereto. The output signal is switched any time that the RF redundancy switch, using the signal selection function, determines that a different source signal should become the output signal. The RF redundancy switch allows a user to set the signal selection function by an interface. A method of intelligent RF redundancy switching between a plurality of RF input signals is also disclosed.

26 Claims, 5 Drawing Sheets

INTELLIGENT RF REDUNDANCY SWITCH

BACKGROUND

This invention is in the field of RF signal processing and RF signal redundancy switches. More specifically, the invention is an intelligent RF redundancy switch that senses and switches between a plurality of incoming RF signals based on selected switching trigger conditions, to provide a highest quality output signal.

BACKGROUND OF THE INVENTION

In many commercial applications, a source of an RF carrier signal is required—for communications and other uses. Where RF signaling requirements have been incorporated into various satellite communications, broadcasting and other applications, the consistency and availability of the RF carrier signal has become more important and many users have implemented redundant signal generators to ensure the availability of RF signal in as high an uptime environment as possible—i.e. with redundant signal generators, if there is a generator failure, a redundant generator can provide a backup RF signal for use.

Where redundant RF signals are implemented, the replacement or backup signal is typically a copy of the primary signal. One of the issues in redundant RF signal generator applications such as this however becomes the switching between generators as required. In a most basic implementation, an operator could manually switch the source of the RF signal based on the functionality of the generator in question or quality of the signal—i.e. if a generator failure is determined either visibly or by instrumentation, the operator can manually switch between the signal output of either the primary or backup generator.

Beyond manual switching between signal sources, a typical prior art approach to the guarantee of highly available high quality RF signals has been to deploy multiple redundant RF signal generators, in a primary and backup capacity, with the primary signal generator automatically causing the failover of the supplied signal to a backup RF signal generator if the primary generator fails.

One automated approach to RF redundancy switching has been to connect a backup signal generator to the primary generator and when the primary generator detects a signal deficiency it automatically fails over to the signal from the backup signal generator. However in such a case, if the primary generator itself was to fail such that it could not automatically trigger the switchover to the backup signal source, a significant shortcoming in the detection and switching methodology exists. Thus an RF redundancy switching approach that did not rely on hardware integral with one of the RF signal generators itself would be desirable from the perspective of minimizing the likelihood of a hardware failure causing a problem resulting in inability to switch between signal sources.

Standalone RF switching hardware avoids the potential for signal switching failure which exists in a case where the switching hardware is an integrated function of the signal generating hardware.

Many of these prior art redundancy based signal switching approaches only switch sources based on a power outage or hard failure of a signal generator—current RF redundancy switches do little to no analysis of incoming signals to determine if the incoming RF signals are valid. Many of these switches also rely on an alarm indicator from an RF signal generator to determine the existence of a switching condition—alarm inputs to the redundancy switch typically come from the RF signal source and as such to properly use the RF signal source to indicate its own failure requires the RF source to fail in a manner where it can determine it has failed—in many scenarios an RF signal source could fail but be unaware of its failure.

Other approaches may monitor one signal quality characteristic of the RF carrier signals generated and switch based on those values. Still other approaches may detect a signal switching trigger condition based on a preset calculation based on more than one measured value in respect of the source signals. These are all very limiting approaches—if there were a way to either adaptively alter the function determining a trigger condition during operation, or for an operator to interactively select the parameters to be used, and/or program the details of the trigger detection function, it is believed that this would be well received in industry.

One of the other limitations of prior art approaches to redundancy switching in such applications is also the limitation to two signal generators. Prior art architectures typically comprise a primary and a backup signal generator—some operators may wish to find ways to knowledgeably implement a system architecture that deployed even a higher number of RF carrier signal generators too maximize even further the availability of signal—i.e. if two units were to fail, the availability of one or more additional signal generators provides even higher guaranteed availability.

If it were possible to create an RF redundancy switch that included signal measurement and analysis capabilities integrally, so that the RF redundancy switch could verify the validity of incoming signals and switch based on the signal analysis—i.e. not only in the loss of a signal altogether from a power or hardware failure but also in the event of the loss of a valid signal—it is believed this would be welcomed in this industry.

BRIEF SUMMARY

The present invention is an intelligent RF redundancy switch with a user-configurable signal measurement and analysis function integrated therein. The intelligent RF redundancy switch monitors the availability and quality of a plurality of RF source signals to actively select the best source signal to be used as the output signal and switching a signal output accordingly.

The invention accomplishes its objectives in first instance comprising an RF redundancy switch for outputting a selected output signal selected from a plurality of source signals, said RF redundancy switch comprising:
  a plurality of signal inputs, each for receiving a source signal from an RF signal generator;
  a signal output for outputting an output signal, being a selected source signal corresponding to one of the signal inputs;
  a signal monitor capable of continuously monitoring the plurality of signal inputs and capturing at least one signal validity criteria for each source signal;
  a signal comparator which uses a signal selection function to select one of the plurality of source signals to be used as the output signal, based on the at least one signal validity criteria captured by the signal monitor; and
  a signal switch to select and output the selected output signal on the signal output from the available signal inputs;
  wherein the RF redundancy switch in operation outputs the selected output signal on the signal output and switches the output signal sent to the signal output each time a new output signal is selected by the signal comparator, and wherein the RF redundancy switch allows a user to select the signal selection function to be used by the signal comparator.

Individual components of the RF redundancy switch could be of many types. For example, the signal monitor could be an RF demodulator/decoder which can capture the values of at least one signal validity criteria for each of the plurality of signal inputs—either by monitoring all of the plurality of source signals in a single signal monitor unit, or using separate signal monitor equipment for each attached source signal via its signal input. In the case of individual signal monitoring for each signal input, the signal monitor comprises a plurality of RF demodulator/decoders equaling the number of the plurality of signal inputs, each capable of capturing the values of at least one signal validity criteria for one signal input. Alternatively the signal monitor might be a multi-channel RF demodulator/decoder capable of capturing the values of at least one signal validity criteria for all of the signal inputs.

The signal switch is any switching circuit or equipment capable of switching the plurality of source signals to the signal output based on the determination of the selected output signal by the signal comparator.

Many types of signal validity criteria could be measured and used in the signal selection function, including the availability of a particular source signal; failure of an RF signal generator corresponding to a particular source signal; signal strength of the plurality of source signals; and at least one signal quality measurement of the plurality of source signals. The at least one signal quality measurement is selected from the group of: modulator error ratio; corrected FEC blocks; and received FEC blocks with errors.

A user interface operatively connected to the signal comparator allows a user to select the signal selection function to be used thereby. The user interface could be any of an analog or digital control, or even a remote software app or interface on a computing device. The user can select from a plurality of preprogrammed signal selection functions, or can program a signal selection function based upon the available captured signal monitoring criteria.

The signal selection function is any mathematical comparison function which can be applied to the captured signal validity criteria to select a desired output signal. The signal selection function could be a value comparison of a single signal validity criteria captured in respect of each of the plurality of source signals, the source signal with the highest quality value of said single signal validity criteria being selected as the output signal. Alternatively the signal selection function could be a value comparison of the value of a mathematical function for each of the plurality of source signals using more than one signal validity criteria captured in respect of the respective source signal, the source signal with the highest quality value of said mathematical function being selected as the output signal.

The RF redundancy switch might have any plural number of signal inputs, all or not all of which might always be used.

In addition to the RF redundancy switch, the invention also includes a method of intelligently outputting a selected RF output signal from a plurality of source signals based on the detection of a signal switching condition, said method using an RF redundancy switch comprising a plurality of signal inputs, each for receiving a source signal from an RF signal generator; a signal output for outputting an output signal, being a selected source signal corresponding to one of the signal inputs; signal monitoring means capable of continuously monitoring the plurality of signal inputs and capturing at least one signal validity criteria for each source signal; signal comparison means which uses a signal selection function to select the best of the plurality of source signals to be used as the output signal, based on the at least one signal validity criteria captured by the signal monitor; and signal switching means to select and output the selected output signal on the signal output from the available signal inputs.

The method comprises:
connecting the RF redundancy switch to a plurality of source signals via the plurality of signal inputs;
a user selecting the signal selection function for use by the signal comparator;
activating the plurality of source signals;
operating the RF redundancy switch and capturing at least one signal validity criteria for each source signal using the signal monitor;
during said operation, continuously comparing the captured at least one signal validity criteria for the source inputs using the signal comparator, and the signal selection function, to select the best source signal to be the selected source signal for use as the output signal; and
providing the selected source signal via the signal output using the signal switch, whenever a new selected source signal is selected as the output signal.

The RF redundancy switch in operation outputs the selected output signal on the signal output and switches the output signal sent to the signal output each time a new output signal is selected by the signal comparator. The RF redundancy switch allows a user to select the signal selection function to be used by the signal comparator.

The method could be practiced using the RF redundancy switch of any embodiment of the invention outlined herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

The present invention is an intelligent RF redundancy switch with a user-configurable signal measurement and analysis function integrated therein. The intelligent RF redundancy switch monitors the availability and quality of a plurality of RF source signals to actively select the best source signal to be used as the output signal and switching a signal output accordingly. The following details the invention in further detail.

Figure 1:
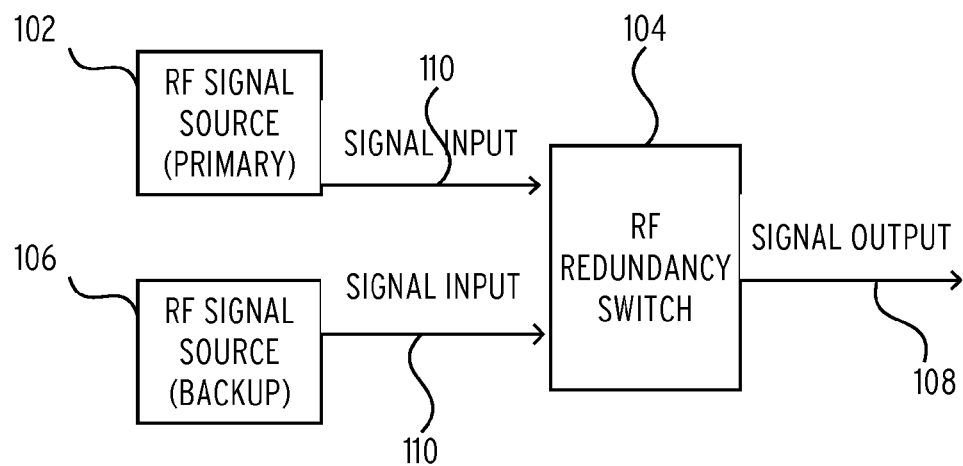
FIG. 1 illustrates the elements of one approach to the deployment of an RF redundancy switch in accordance with the present invention.

Signal Monitoring and Switching Methodology:

As outlined above, the RF redundancy switch of the present invention represents an advancement over the current state of the art in redundancy switches used in broadcast and similar applications to sense and switch between RF signal sources. Prior art methods of RF redundancy switching rely upon either an A/B type switch to switch between two source signals when one of the signal generators fails so that one of the signals is not available, or in some cases there is basic quality monitoring applied to the determination of signal selection based on relative signal strength—for example see U.S. Pat. No. 8,031,045 to Tsvey. All of these prior art methods are basic in the amount of analysis which is done of the source signals, and the analysis of the source signals takes place according to a preprogrammed or "hard-coded" algorithm—there is no ability for the particular operator to select or refine their own approach to the selection of the best signal for output from a plurality of source signals. FIG. 1 shows a block diagram of the key components of the method of intelligently outputting a selected RF output signal, from which the key entities or components of the invention can be seen.

In the current case, the RF redundancy switch 104 and related method of intelligently outputting a selected RF output signal disclosed herein relies upon an RF redundancy switch 104 which can switch between a plurality of source signals on a plurality of signal inputs (potentially more than two source signals) and will monitor or capture at least one signal validity criteria with respect to each of the plurality of source signals in operation. In the case of the embodiment of FIG. 1 there are shown two source signals, being an RF signal source (primary) 102 and an RF signal source (backup) 106. The RF redundancy switch 104 will switch between these two inputs RF signal source (primary) 102 and RF redundancy switch 104 based upon the captured signal validity criteria and output a selected source signal as the output signal on the signal output 108.

The RF redundancy switch 104, using its integrated hardware and functions, will determine the best signal to be output based upon the application of a mathematical signal selection function to the captured at least one signal validity criteria—in some cases the signal selection function could be a straight comparison of a single captured signal validity criteria, or where more than one signal validity criteria is captured with respect to the plurality of source signals the signal selection function could be a mathematical formula or function incorporating more than one signal validity criteria into the determination of the best of the plurality of source signals to be selected as the output signal.

The RF redundancy switch 104 allows a user to select the signal selection function to be used in the method of intelligently outputting a selected RF output signal or operation of the RF redundancy switch 104—a user interface could be used which allowed for the selection from a plurality of preprogrammed signal selection functions, or a signal selection function could be completely custom programmed by the user in other cases, where the user interface was configured to permit same.

Figure 2:
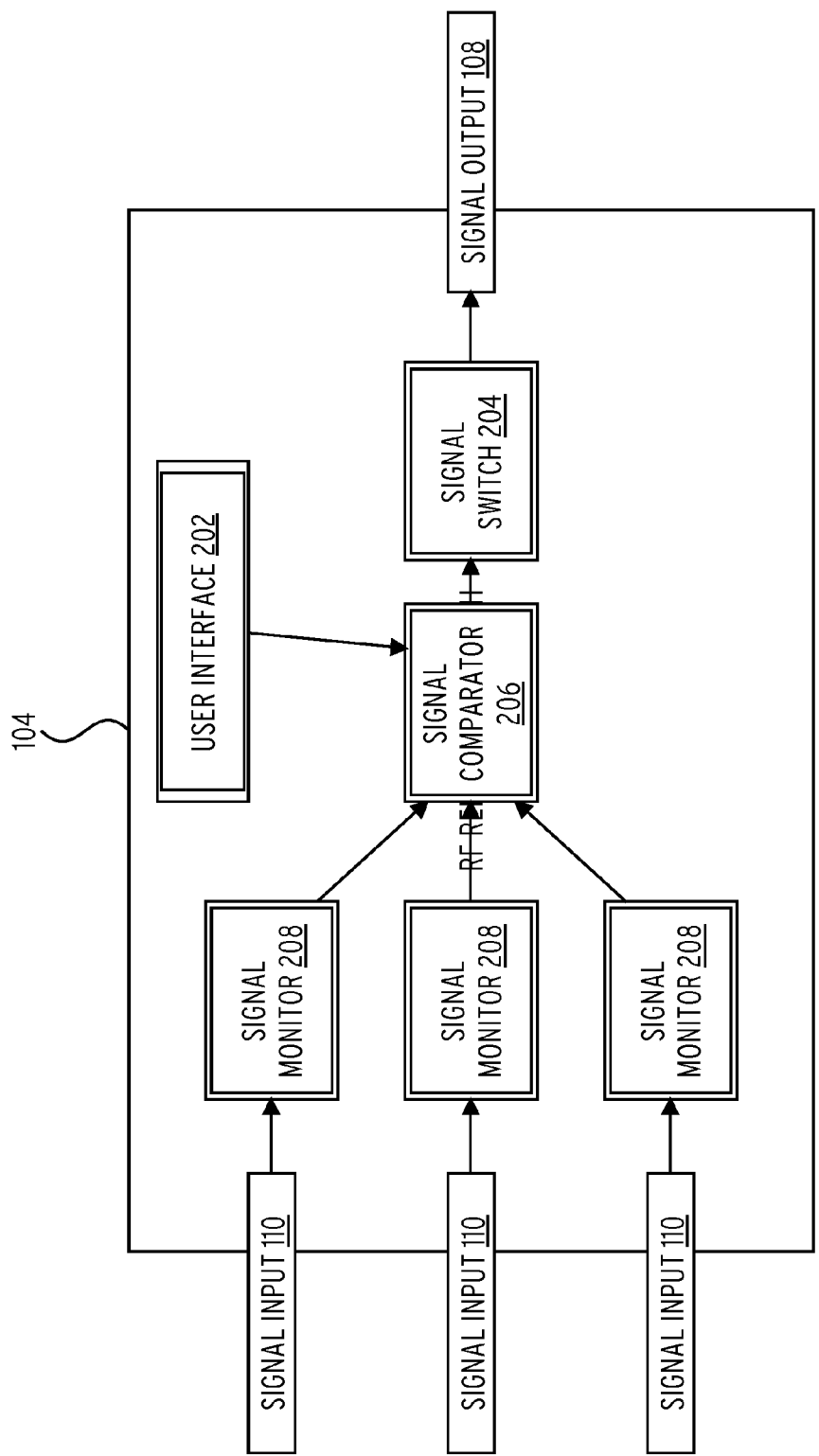
FIG. 2 illustrates an alternate embodiment of the RF redundancy switch of the present invention in which the plurality of source signals are passed straight through the monitoring and switching circuitry without splitting.

RF Redundancy Switch:

FIG. 2 is a block diagram demonstrating the components or subsystems of an RF redundancy switch 104 in accordance with one embodiment of the present invention. The RF redundancy switch 104 first comprises a plurality of signal inputs 110, which can each be connected to an RF signal generator of at least one RF source signal which it is desired to monitor and switch in accordance with the present invention. Each signal input 110 could comprise an RF coupler of many different types—all such connectors and signal infrastructures are contemplated within the scope hereof.

Each signal input 110 is connected to the signal monitor 208. The signal monitor 208 comprises electronic components capable of continuously monitoring at least one signal validity criteria in respect of the source signal connected thereto. The signal monitor 208 might comprise a single circuit capable of simultaneously monitoring the desired signal validity criteria for all of the source signals connected via signal input 110 to the RF redundancy switch 104, or as shown in this Figure the signal monitor 208 might comprise a separate signal monitoring component for each source signal. The RF redundancy switch 104 shown in FIG. 2 shown three signal input 110 connections for connection the three source signals—it will be understood that anywhere from two to a higher number of source signals from a plurality of RF signal generators could be used and all such numbers and attendant equipment modifications are contemplated within the scope of the present invention.

The signal monitor 208 could comprise different types of circuitry for monitoring the values or quality of a source RF signal. It is specifically contemplated that each signal monitor 208 might comprise an RF demodulator/decoder which can capture the values of at least on signal validity criteria. However any type of equipment and related operating software or the like which accomplishes the objective of measuring at least one signal validity criteria for each of the plurality of source signals is contemplated within the scope of the present invention.

The signal monitor 208 are connected to the signal comparator 206, which is a logic circuit or other software and hardware combination capable of comparing the quality of the plurality of source signals by applying a mathematical signal selection function to the captured signal validity criteria. The signal comparator 206 will also in the embodiment shown interact with a user interface 202 which allows the user of the RF redundancy switch 104 to select the signal selection function to be applied in operation. As outlined herein the signal selection function can comprise any mathematical comparison or function of the signal validity criteria captured in respect of the plurality of source signals—as outlined one key element of the invention is that the user can select the signal selection function to be applied—whether that be selecting a comparison value range for a preprogrammed mathematical signal selection function or selecting from a plurality of available preprogrammed signal selection function options. Allowing the user to configure by selection of parameters the signal selection function is a key element herein.

The signal comparator 206 will receive all of the captured signal validity criteria readings for all of the course signals captured by the signal monitor 208 corresponding thereto. In operation of the RF redundancy switch 104, the sampling of the plurality of source signals by their respective signal monitor 208 and monitoring of that captured information by the signal comparator 206 will be ongoing. The signal comparator 206 is a logic evaluation system such as a microprocessor, microcontroller, discrete logic gates or a programmable logic device.

The signal comparator 206 communicates with the signal switch 204, which is a controllable switching circuit or component, which can control, switch and route one of the plurality of source signals to the signal output 108 based upon determination by the signal comparator 206 in application of the signal selection function of the best quality source signal to be selected as the output signal. The signal comparator 206 will in first instance determine the source signal to be selected from the plurality of source signals for use as the output signal, and will then indicate to the signal switch 204 the switching of the output signal as required to maintain the desired output signal parameters and consistency. Having the ability to contemporaneously switch between multiple source signals in an RF application increases the reliability and availability of the RF output.

There are many different types of circuits and routing of the plurality of source signals which can be used to accomplish the present invention as well. The signal input 110 for a source signal might be connected directly to the incoming source signal and might be connected in turn directly to the related signal monitor 208 passing all of the signal directly therethrough for monitoring, as shown in FIG. 2. Alternatively, each signal input 110 could divide the incoming source signal sending the majority of the power of that source signal to the signal switch 204, and a small amount to the signal monitor 208.

The RF redundancy switch 104 may also include external alarm inputs for use in the application of the signal selection function by the signal comparator 206. An External alarm input 308 is shown in the embodiment of FIG. 3 for demonstrative purposes.

The path of the plurality of source signals from the signal input 110 through the signal monitor 208 and the signal switch 204 to the signal output 108 can be seen in these Figures as well.

Figure 3:
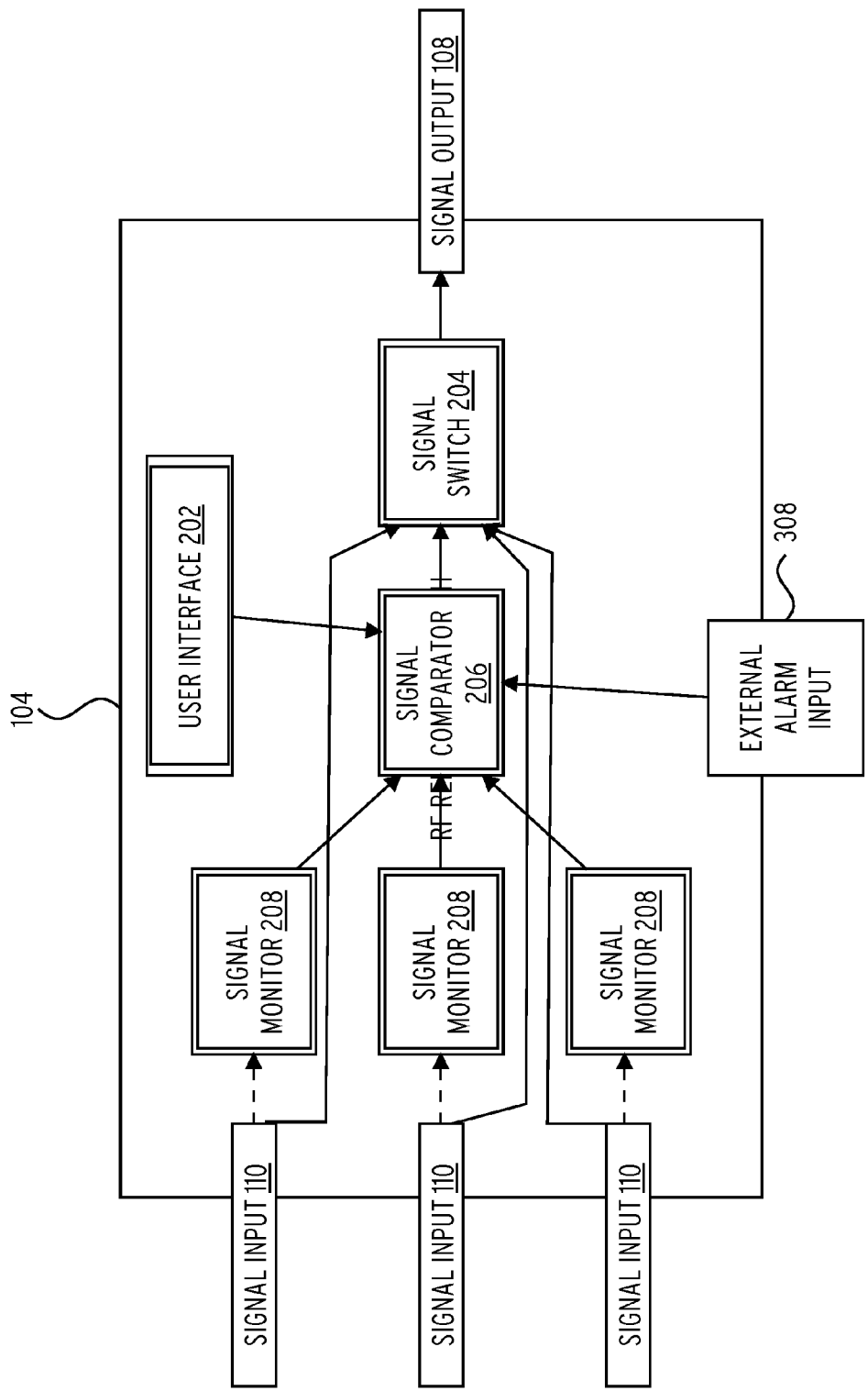
FIG. 3 illustrates an alternate embodiment of the RF redundancy switch of the present invention in which the plurality of source signals are split for monitoring and switching purposes.

The RF redundancy switch 104 shown in FIG. 2 and FIG. 3 shows the configuration of the circuitry therein with the signal monitor 208 between the signal input 110 connections and the signal switch 204—the plurality of source signals will all be monitored by the signal monitor 208 to capture the at least one signal validity criteria in respect thereof. The at least one signal validity criteria captured can then be used by the signal comparator 206 to assess the source signals and select the output signal therefrom and control the signal switch 204 accordingly. As can be seen in these two embodiments of the RF redundancy switch 104, the signal monitor is operatively connected directly to the plurality of signal inputs, whereby the at least one signal validity criteria captured in respect of each of the plurality of source signals is captured before the signal switch. The signal selection function selects the output signal by comparing the signal validity criteria captured for all of the source signals; and if the signal selection function determines that the output signal should be switched, the signal comparator causing the signal switch to switch the signal output to the selected output signal.

Figure 4:
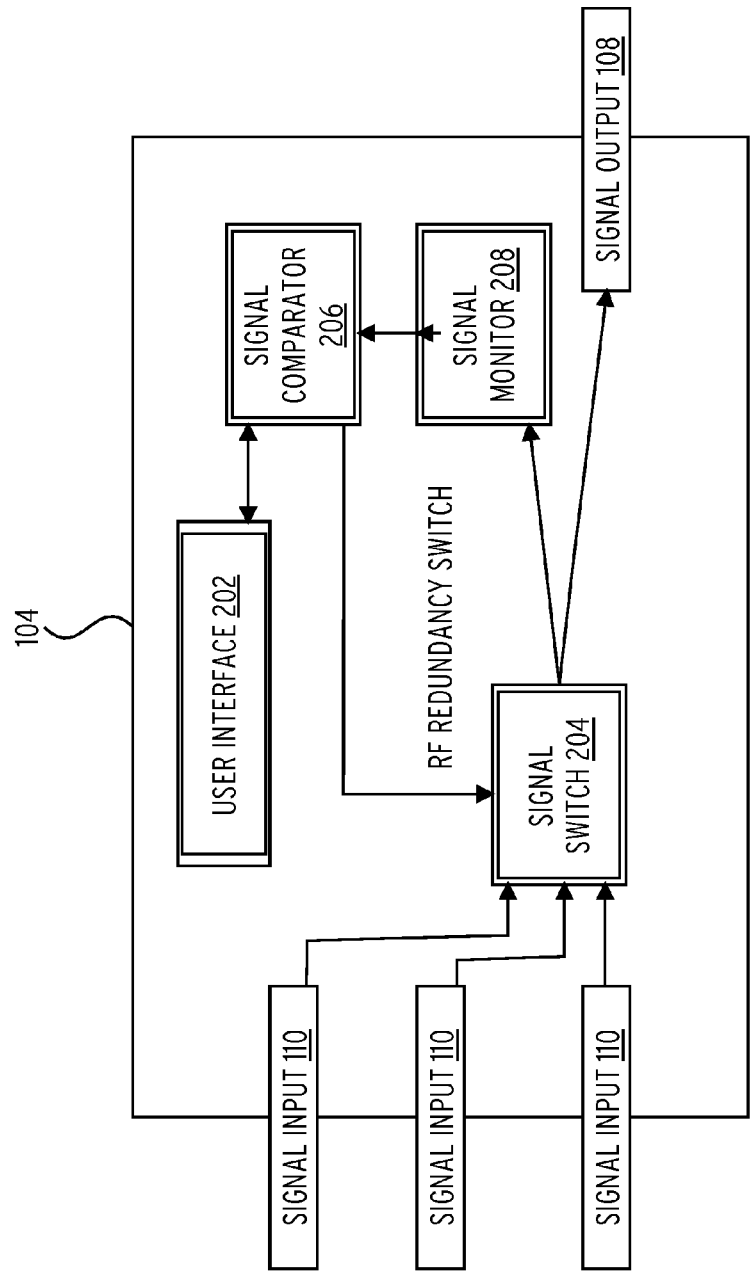
FIG. 4 illustrates an alternate embodiment of the RF redundancy switch of the present invention in which the plurality of source signals are passed straight through the monitoring and switching circuitry without splitting.

FIG. 4 shows a further embodiment of the RF redundancy switch 104 of the present invention, again showing in this case three source signals and signal input 110 hardware connections. The RF redundancy switch 104 of this Figure differs insofar as the inline placement of the various components is varied from that of FIG. 2. The signal input 110 are each connected directly to the signal switch 204, with the signal output 108 therefrom providing connectivity to the selected output signal thereon for downstream use or processing. The signal output 108 is split to also connect the signal monitor 208 to the output signal.

By connecting the output signal to the signal monitor 208, the signal monitor 208 will capture the at least one signal validity criteria in respect of the source inputs by capturing at least one signal validity criteria in respect of an output signal out by the switch selected from the source signals—if in application of the signal selection function by the signal comparator 206 as shown it is determined that the output signal should be switched, the signal switch 204 will switch to another source signal and signal input 110 under control of the signal comparator 206 and the at least one signal validity criteria required to apply the signal selection function to assess the quality of that source signal on the currently selected signal input 110 will then be captured by the signal monitor 208. The signal monitor is connected to the signal output and receives the output signal; the signal switch is connected between the plurality of signal inputs and the signal monitor; and the at least one signal validity criteria in respect of the plurality of source signals can be captured sequentially, by causing the signal switch to switch from one source signal to another on the signal output and capturing the at least one signal validity criteria in respect of the output signal which corresponds to one of the source signals. In this embodiment the signal selection function determines the adequacy of a particular source signal as the current output signal based on the signal validity criteria captured in respect of the output signal; and if the signal selection function determines that the output signal should be switched, the signal comparator causing the signal switch to switch the signal output to another source signal until the signal selection function is satisfied of the adequacy of the corresponding source signal.

Signal Monitor:

As outlined above, the signal monitor 208 could be either a multi-source unit capable of monitoring at least one signal validity criteria for all of the source signals, or could be a plurality of single signal monitor 208 units each for the demodulation and monitoring of a single source signal. Both such approaches are contemplated within the scope of the present invention.

Those skilled in the art of RF signal processing will understand the various types of RF signal monitoring equipment which could be used as a plurality of single channel 208 units, or a single multi-source signal monitor 208 unit—any equipment which will accomplish the necessary objective of decoding or demodulating an RF source signal to measure at least one signal validity criteria in respect of the source signal, for use by the signal comparator 206 in the application of the signal selection function is contemplated within the scope of the present invention.

Signal Comparator:

As outlined above, the signal comparator 206 could be a microprocessors, a programmable logic controller, logic gates or other equipment which could interpret the captured signal validity criteria received from the signal monitor 208 and apply the selected signal selection function thereto, for the purpose of selecting or maintaining the output signal from the available plurality of source signals. Various types of equipment could be used for this purpose which will again be understood by those skilled in the art and any component capable of this function—interacting with the user interface 202 for selection or adjustment of the signal selection function and comparison of the at least one signal validity criteria for the source signals using the signal selection function—is contemplated within the scope hereof.

Signal Validity Criteria:

Many different types of signal validity criteria could be captured for use in the testing and assessment of the relative quality of a plurality of source signals and all such signal validity criteria as will be understood to those skilled in the art are contemplated within the scope of the present invention. Either a single signal validity criteria might be captured and used, or some embodiments of the signal selection function might use a weighting algorithm or function which would apply weighted values to multiple signal validity criteria captured for the purpose of selection of the output signal.

Some examples of signal validity criteria which could be captured or measured and used in the method of the present invention and by the RF redundancy switch 104 include the availability of a particular source signal (i.e. detection of signal or generator source failure or otherwise detecting the no availability of a source signal on a particular signal input 110), the signal strength of each of the plurality of source signals, or at least one signal quality measurement of the demodulated and decoded source signals. Any measurable quality or quantitative measurement with respect to the source signals could comprise a signal validity criteria and are all, including those outlined herein and those understood those skilled in the art of RF signal processing, contemplated within the scope of the present invention.

Signal Selection Function:

As outlined herein, the signal selection function is a mathematical comparison direction to be used by the signal comparator 206 to compare the plurality of source signals and identify the best source signal to be switched and used as the output signal by the RF redundancy switch 104. The signal selection function could be a mathematical function designed to allow for a straight single signal validity criteria comparison of the source signals, or could be a complex function allowing for comparison of the plurality of source signals using more than one signal validity criteria, potentially with weightings attached and adjustable in respect of the signal validity criteria. Any mathematical function which will allow for the comparison of the plurality of source signals and the identification of one of the plurality of source signals as the best quality source signal for identification as the output signal is contemplated within the scope hereof.

User Interface:

As outlined elsewhere above, the RF redundancy switch 104 includes in most cases a user interface 202 which can be used by a user of the RF redundancy switch 104 to select the signal selection function. The user interface 202 could take many different forms, from one or more analog controls on the RF redundancy switch 104 which would allow a user to select the signal selection function to be used in selection of the selected output signal, or even to select ranges of signal validity criteria to be used in the application of the signal selection function and related calculations etc. Rather than analog controls, a digital user interface 202 could also be used and will be understood by those skilled in the art of electronics and interface design. It is even possible that a software app for use on a tablet, smart phone, remote computer or the like could be used to interact with the RF redundancy switch 104 and the signal comparator 206 in a headless fashion for the purpose of selecting or fine-tuning the signal selection function.

A digital user interface 202 or a software app or the like as a user interface 202 would provide great flexibility in terms of the ability of the user to select or program the signal selection function—in this case it would be easier for a user using a digital user interface 202 to either select from a larger menu of preprogrammed signal selection function options, or to interact further with the user interface 202 to define the parameters of signal validity criteria that would trigger the switching of source signals.

The signal selection function itself is a mathematical comparator or function which is used to compare the signal validity criteria captured for each signal source. In addition to being able to select from a plurality of programmed signal selection functions, a user in some embodiments could also select the particular signal validity criteria to be used in the signal selection function, adjust the weighting of different signal validity criteria where multiple signal validity criteria are used in the signal selection function, or even in some cases a digital user interface 202 might actually permit the user to fully customize or select the elements of a signal selection function to be used and completely custom program same. It will be understood that any such modification and any such type of a user interface 202 which allows the user to in basic embodiments select from a plurality of preset signal selection functions through to adjusting the ranges, weighting or other aspects of a signal selection function, to completely customizing a particular signal selection function program are contemplated within the scope of the present invention. The ability of the user to adjust the signal selection function or its detailed operation are a key aspect of the present invention.

Figure 5:
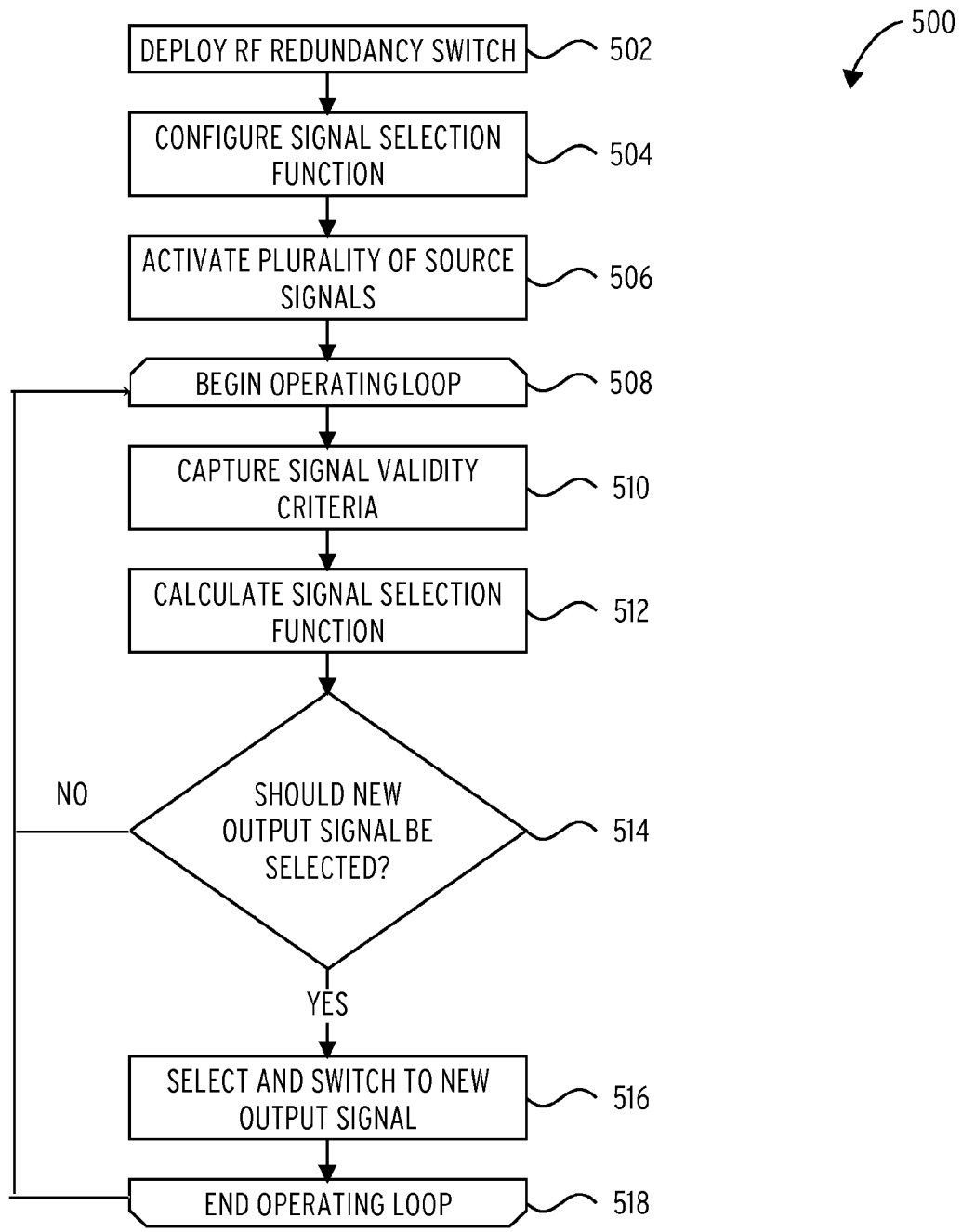
FIG. 5 is a flowchart demonstrating the steps involved in one embodiment of the method of intelligently outputting a selected RF output signal of the present invention.

Method Overview:

In addition to an RF redundancy switch 104, the present invention encompasses a method of intelligently outputting a selected RF output signal which uses components accomplishing the method of operation of the RF redundancy switch 104 disclosed above. Referring to FIG. 5 there is shown a flow chart demonstrating the steps of one embodiment of a method of intelligently outputting a selected RF output signal 500 of the present invention.

The method of intelligently outputting a selected RF output signal 500 from a plurality of source signals based on the detection of a signal switching condition uses an RF redundancy switch comprising a plurality of signal inputs, each for receiving a source signal from an RF signal generator; a signal output for outputting an output signal, being a selected source signal corresponding to one of the signal inputs; signal monitor capable of continuously monitoring the plurality of signal inputs and capturing at least one signal validity criteria for each source signal; signal comparator which uses a signal selection function to select the best of the plurality of source signals to be used as the output signal, based on the at least one signal validity criteria captured by the signal monitor; and signal switch to select and output the selected output signal on the signal output from the available signal inputs. The first step of the method of intelligently outputting a selected RF output signal 500 shown at block 502 is the deployment of the RF redundancy switch, which would consist of site installation of the RF redundancy switch and connection thereof by the plurality of signal inputs to a plurality of RF signal generators, and the connection of the signal output to a downstream component for the transmission or sue of the selected output signal.

The RF redundancy switch of the present invention allows the user thereof to configure the signal selection function thereon—by selection from pre-programmed options in terms of the type of function to be used, sensitivity or parameters for application to the testing or otherwise. The user would configure the signal selection function at block 504.

In operating the RF redundancy switch, the plurality of source signals can be activated—block 506—and an operating loop shown commenced. The loop extends from opening loop block 508 through closing loop block 518 in the Figure.

In operation of the RF redundancy switch, the RF redundancy switch would capture at least one signal validity criteria in respect of the plurality of source signals, using a signal monitor therein in respect of each signal input. Capture of the criteria is shown at block 510. The user-selected signal selection function would be applied to the captured signal validity criteria by a signal comparator—likely being a logic circuit or the like for the application of the mathematical signal selection function to the signal validity criteria captured, to determine the best quality signal of the plurality of source signals to be selected as the output signal Application of the signal selection function to the captured signal validity criteria is shown at block 512.

The application of the signal selection function is visually demonstrated in this Figure by decision block 514—if based on application of the signal selection function it is determined that a new output signal should be selected from the plurality of source signals, signal switch in the RF redundancy switch will switch the output signal to the new selected output signal—block 516—and the monitoring loop can return to opening loop block 508. Alternatively if no change of output signal is required, the signal switch will remain inactive and the loop returns to opening loop block 508.

It will be understood that the method shown in FIG. 5 is only one basic embodiment of a method of intelligently outputting a selected RF output signal 500 in accordance with the present invention, and that many variations on the overall method of intelligent RF switching using a switching component as outlined herein will be obvious to one skilled in the art and is contemplated within the scope of the present invention.

It will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Drawings

What is claimed is:

1. An RF redundancy switch for outputting a selected output signal selected from a plurality of source signals, said RF redundancy switch comprising:
    a plurality of signal inputs, each for receiving a source signal from an RF signal generator;
    a signal output for outputting an output signal, being a selected source signal corresponding to one of the signal inputs;
    a signal switch operatively connected to the plurality of signal inputs and the signal output, to select and output a selected one of the plurality of source signals on the signal output as the output signal;
    a signal monitor capable of continuously monitoring the plurality of signal inputs and capturing at least one signal validity criteria for each source signal; and
    a signal comparator in communication with the signal monitor which uses a signal selection function to select the output signal, based on the at least one signal validity criteria captured by the signal monitor;
    wherein in operation of the RF redundancy switch, the signal switch switches the output signal sent to the signal output each time a new output signal is selected by the signal comparator;
    and wherein the RF redundancy switch allows a user to select the signal selection function to be used by the signal comparator.

2. The RF redundancy switch of claim 1 wherein the signal monitor comprises an RF demodulator/decoder which can capture the values of at least one signal validity criteria for each of the plurality of signal inputs.

3. The RF redundancy switch of claim 2 wherein the signal monitor is a multi-channel RF demodulator/decoder capable of capturing the values of at least one signal validity criteria for all of the signal inputs.

4. The RF redundancy switch of claim 1 wherein:
    the signal monitor is operatively connected directly to the plurality of signal inputs, whereby the at least one signal validity criteria captured in respect of each of the plurality of source signals is captured before the signal switch;
    the signal selection function selects the output signal by comparing the signal validity criteria captured for all of the source signals; and
    if the signal selection function determines that the output signal should be switched, the signal comparator causing the signal switch to switch the signal output to the selected output signal.

5. The RF redundancy switch of claim 4 wherein the signal monitor comprises a plurality of RF demodulator/decoders equaling the number of the plurality of signal inputs, each capable of capturing the values of at least one signal validity criteria for one signal input.

6. The RF redundancy switch of claim 1 wherein:
    the signal monitor is connected to the signal output and receives the output signal;
    the signal switch is connected between the plurality of signal inputs and the signal monitor;
    the at least one signal validity criteria in respect of the plurality of source signals can be captured sequentially, by causing the signal switch to switch from one source signal to another on the signal output and capturing the at least one signal validity criteria in respect of the output signal which corresponds to one of the source signals;
    the signal selection function determines the adequacy of a particular source signal as the current output signal based on the signal validity criteria captured in respect of the output signal; and
    if the signal selection function determines that the output signal should be switched, the signal comparator causing the signal switch to switch the signal output to another source signal until the signal selection function is satisfied of the adequacy of the corresponding source signal.

7. The RF redundancy switch of claim 1 wherein the signal switch comprises a signal switching circuit capable of switching any one of the plurality of signal inputs to the signal output.

8. The RF redundancy switch of claim 1 wherein the at least one signal validity criteria is selected from the group of:
  availability of a particular source signal;
  failure of an RF signal generator corresponding to a particular source signal;
  signal strength of the source signal; and
  at least one signal quality measurement of the source signal.

9. The RF redundancy switch of claim 8 wherein an RF demodulator/decoder in respect of each source signal and the at least one signal quality measurement is selected from the group of:
  modulator error ratio;
  corrected FEC blocks; and
  received FEC blocks with errors.

10. The RF redundancy switch of claim 1 wherein the signal comparator includes a user interface by which a user can select the signal selection function to be used thereby.

11. The RF redundancy switch of claim 10 wherein the user can select from a plurality of preprogrammed signal selection functions.

12. The RF redundancy switch of claim 10 wherein the user can use the user interface to program a custom signal selection function based upon the available captured signal validity criteria.

13. The RF redundancy switch of claim 1 wherein the signal selection function is a value comparison of a single signal validity criteria captured in respect of each of the plurality of source signals, the source signal with the highest quality value of said single signal validity criteria being selected as the output signal.

14. The RF redundancy switch of claim 1 wherein the signal selection function is a value comparison of the value of a mathematical function for each of the plurality of source signals using more than one signal validity criteria captured in respect of the respective source signal, the source signal with the highest quality value of said mathematical function being selected as the output signal.

15. A method of intelligently outputting a selected RF output signal from a plurality of source signals based on the detection of a signal switching condition, said method comprising:
  providing an RF redundancy switch, the RF redundancy switch comprising:
    a plurality of signal inputs, each for receiving a source signal from an RF signal generator;
    a signal output for outputting an output signal, being a selected source signal corresponding to one of the signal inputs;
    a signal monitor capable of continuously monitoring the plurality of signal inputs and capturing at least one signal validity criteria for each source signal;
    a signal comparator which uses a signal selection function to select the best of the plurality of source signals to be used as the output signal, based on the at least one signal validity criteria captured by the signal monitor;
    a signal switch to select and output the selected output signal on the signal output from the available signal inputs;
  connecting the RF redundancy switch to a plurality of source signals via the plurality of signal inputs;
  receiving a selection of the signal selection function for use by the signal comparator;
  activating the plurality of source signals;
  operating the RF redundancy switch and capturing at least one signal validity criteria for each source signal using the signal monitor;
  during said operation, continuously comparing the captured at least one signal validity criteria for the source inputs using the signal comparator, and the signal selection function, to select the best source signal to be the selected source signal for use as the output signal; and
  providing the selected source signal via the signal output using the signal switch, whenever a new selected source signal is selected as the output signal.

16. The method of intelligently outputting a selected RF output signal of claim 15 wherein the signal monitor comprises an RF demodulator/decoder which can capture the values of at least one signal validity criteria for each of the plurality of signal inputs.

17. The method of intelligently outputting a selected RF output signal of claim 16 wherein the signal monitor is a multi-channel RF demodulator/decoder capable of capturing the values of at least one signal validity criteria for all of the signal inputs.

18. The method of intelligently outputting a selected RF output signal of claim 16 wherein:
  the signal monitor is operatively connected directly to the plurality of signal inputs, whereby the at least one signal validity criteria captured in respect of each of the plurality of source signals is captured before the signal switch;
  the signal selection function selects the output signal by comparing the signal validity criteria captured for all of the source signals; and
  if the signal selection function determines that the output signal should be switched, the signal comparator causing the signal switch to switch the signal output to the selected output signal.

19. The method of intelligently outputting a selected RF output signal of claim 18 wherein the signal monitor comprises a plurality of RF demodulator/decoders equaling the number of the plurality of signal inputs, each capable of capturing the values of at least one signal validity criteria for one signal input.

20. The method of intelligently outputting a selected RF output signal of claim 16 wherein:
  the signal monitor is connected to the signal output and receives the output signal; the signal switch is connected between the plurality of signal inputs and the signal monitor;
  the at least one signal validity criteria in respect of the plurality of source signals can be captured sequentially, by causing the signal switch to switch from one source signal to another on the signal output and capturing the at least one signal validity criteria in respect of the output signal which corresponds to one of the source signals;
  the signal selection function determines the adequacy of a particular source signal as the current output signal based on the signal validity criteria captured in respect of the output signal; and
  if the signal selection function determines that the output signal should be switched, the signal comparator causing the signal switch to switch the signal output to another source signal until the signal selection function is satisfied of the adequacy of the corresponding source signal.

21. The method of intelligently outputting a selected RF output signal of claim 15 wherein the signal switch comprises a logic circuit capable of switching any one of the plurality of signal inputs to the signal output.

22. The method of intelligently outputting a selected RF output signal of claim 15 wherein the at least one signal validity criteria is selected from the group of:
   availability of a particular source signal;
   failure of an RF signal generator corresponding to a particular source signal; signal strength of the plurality of source signals; and
   at least one signal quality measurement of the demodulated and decoded plurality of source signals.

23. The method of intelligently outputting a selected RF output signal of claim 22 wherein the at least one signal quality measurement is selected from the group of:
   modulator error ratio;
   corrected FEC blocks; and
   received FEC blocks with errors.

24. The method of intelligently outputting a selected RF output signal of claim 15 wherein the signal comparator includes a user interface by which a user can select the signal selection function to be used thereby.

25. The RF redundancy switch of claim 24 wherein the user can select from a plurality of preprogrammed signal selection functions.

26. The method of intelligently outputting a selected RF output signal of claim 24 wherein the user can use the user interface to program a signal selection function based upon the available captured signal validity criteria.

\* \* \* \* \*